2,916,471

MIXTURES OF SYNTHETIC ELASTOMERS AND RESINOUS ALDEHYDE-CONDENSATION PRODUCTS AND VULCANIZED PRODUCTS THEREOF

Dietrich Rosahl, Koln-Flittard, Wilhelm Graulich and Hermann Holzrichter, Leverkusen-Bayerwerk, and Ruprecht Ecker, Koln-Ostheim, Germany, assignors to Farbenfabriken Bayer Aktiengesellschaft, Leverkusen, Germany, a corporation of Germany No Drawing. Application October 20, 1954
Serial No. 463,598

Claims priority, application Germany October 23, 1953

13 Claims. (Cl. 260—43)

The present invention relates to mutually plasticized mixtures of synthetic elastomers with aldehyde resins, and more particularly to such mixtures in which the elastomers are copolymers of conjugated diolefins with (a) acrylonitriles or acrylic acid esters and (b) polymerizable organic compounds containing carbonyl or carboxyl groups and in which the aldehyde resins are fusible and soluble.

Objects of the invention include the formulation of easily processable resinous compositions which may be worked up into products having improved mechanical properties. More specific objects will become apparent from the following description.

It is well known that valuable plastics may be produced from mixtures of elastomeric copolymers of butadiene and acrylonitrile with phenol-formaldehyde resins. However, these plastics do not meet all demands as regards their mechanical properties and the compatibility of the components.

It has now been found that plastics having outstanding mechanical properties are obtained from mixtures of synthetic elastomers containing carbonyl or carboxyl groups with resinous aldehyde condensation products, which are fusible and soluble. The aforementioned elastomers are surprisingly well compatible with a great variety of aldehyde-condensation resins.

The synthetic elastomers used in the blends of the present invention are produced by copolymerizing:

(a) A butadiene-1,3 such as butadiene-1,3, isoprene, dimethyl butadiene, chloroprene with (b) An acrylic nitrile, such as acrylonitrile, α-methacrylonitrile, α-ethacrylonitrile, α-chloracrylonitrile and/or an acrylic acid ester the alcohol component of which having 1–4 C-atoms, such as methylmethacrylate, butylacrylate, isobutylacrylate and with (c) An organic compound containing, besides polymerizable double bonds, carbonyl groups, such as aldehyde groups, keto groups, carboxyl groups, carbonamide groups. Appropriate compounds are for instance acroleins, such as α-methylacrolein, α-ethylacrolein, ketones, such as vinylmethylketone, carbonic acids having a polymerizable double bond such as acrylic acid, α-methacrylic acid, monoesters of polymerizable dicarboxylic acids such as monoesters of maleic acid or fumaric acid with alcohols having 1–12 carbon atoms, as for instance maleic acid monobutylester, maleic acid monododecylester, furthermore amides of polymerizable carbonic acids such as acrylic amide and methacrylic acid amide.

In copolymerizing the above monomers, these are applied in such quantities, that the elastomers produced contain 30–85% by weight of compounds (a), 5–45% by weight of compounds (b), and 0.5–20% by weight of compounds (c).

The copolymers are preferably produced by the process of emulsion polymerization which is well known in the art. In carrying out this process the monomers are emulsified in about one-half to ten volumes of water or other aqueous medium with the help of an emulsifier and the emulsion is thereafter polymerized in the presence of a catalyst and, if desired, in the presence of a polymerization modifier. The aqueous emulsion is preferably kept at a pH-value of about 1–6, since the acids cited under (c) are more easily copolymerized as free acids than as salts. Moreover, aldol-condensation is inhibited in case that acroleines are used as monomer (c). The copolymers obtained by this process have Defo values of about 500–4,000 (Defo values are defined in DIN paper No. 53,514).

As catalysts for the copolymerization there are preferably used reducing sulfur compounds having emulsifying properties such as sodium salts of alkylsulfinic acids, the alkyl group of which containing about 10–18 C-atoms. Further suitable catalysts are dialkylnaphthalene sulfinic acids, the alkyl groups of which have at least 4 carbon atoms, and alkylformamidine-sulfinic acids, the alkyl group of the latter having about 10–18 atoms. These catalysts inhibit the oxidation of aldehyde groups to carboxyl groups and therefore are of special importance in case that acroleines are used as monomers (c). However, other known catalysts may be used for the production of copolymers which do not contain aldehyde groups such as Redox-systems or organic peroxides.

The second principal component used in the compositions of the present invention are aldehyde-condensation resinoids which are fusible and soluble in organic or in aqueous solvents.

Especially valuable aldehyde-condensation resinoids are the condensation products of phenols and aldehydes, such as formaldehyde, acetaldehyde, furfural, which are soluble, fusible and capable of cross-linking with an aldehyde such as formaldehyde or a compound supplying formaldehyde such as paraformaldehyde or hexamethylene-tetramine under the condition of vulcanisation. The preference is given to the so-called novolaks, prepared by the condensation of 1 mol of phenol with less than 0.85 mol of formaldehyde in the presence of an acid catalyst. Instead of phenol hydrocarbon derivatives thereof may be used such as cresol, isobutylphenol, octadecylphenol, phenols containing monoolefinic or diolefinic hydrocarbon residues. Furthermore mixtures of phenol with derivatives of phenol may be applied. Further suitable resins are the so-called resols, that is to say resins which are obtained by condensing 1 mol of a phenol with more than 0.8 mol for instance 1.5 mols of formaldehyde in an alkaline medium. Instead of using phenols, urea, thiourea or melamine can be condensed with an aldehyde to produce water-soluble resinoids. Further appropriate resinoids are the so-called X–F resins, that is to say resins obtained from alkylated aromatic hydrocarbons such as xylene and formaldehyde by condensation in an acid medium (Zeitschrift für Angewandte Chemie 1948, pages 88–96). Instead of alkylated aromatic hydrocarbons, condensation products of benzene, toluene, naphthalene, phenol ethers such as anisole with formaldehyde or other aldehydes may be used. Other suitable resins are the mixed-condensation products obtained from formaldehyde, the said aromatic hydrocarbons and other compounds which condense in a similar manner with formaldehyde in acid solution, for instance aromatic sulfonamides, phenols substituted in the o- or p-position, alcohols and carboxylic acids. The compounds may be substituted in the aromatic nucleus with higher alkyl groups.

Preference is given to such resinoids which are fusible and soluble in organic or aqueous solvents. However the degree of condensation may vary within wide limits if only the condensates obtained are curable under the conditions of vulcanization or under the conditions of curing phenolformaldehyde resins.

The relative proportions of the aldehyde-resins and the elastomeric copolymer may vary within wide limits. There are obtained compositions of rubbery character if about 1-80 parts by weight of aldehyde-resin are combined with 100 parts by weight of copolymer, whereas blends having the character of thermosetting resins are obtained by combining 1-40 preferably 1-20 parts by weight of copolymer with 100 parts by weight of aldehyde resin. Rubbery blends are obtained by compounding the components in the proportions defined above in any suitable apparatus, e.g. on ordinary rubber mixing rolls or by adding the aldehyde resin in solution or in emulsion to the copolymer latices. Any of the usual compounding ingredients including sulfur, gas black etc. may be used. The novolaks furthermore require the addition of formaldehyde or of a formaldehyde yielding substance such as hexamethylenetetramine. If one-stage aldehyde resins of the thermosetting type are used addition of aldehyde is not necessary. Oily copolymers of the above composition obtained by polymerizing in the presence of comparatively high amount of modifier may be used as plasticizers. The rubbery blends are worked up according to well known methods. The copolymer latices containing aldehyde resins may be applied in the same manner as ordinary latices for the production of coatings, films, foils, dipped articles etc.

The compositions containing a predominant amount of aldehyde resins are prepared by compounding the ingredients in customary apparatus, thereafter pulverizing or otherwise comminuting the compositions. The pulverized compositions may be handled as molding powders in the conventional art of molding thermosetting materials, after compounding with fillers, pigments, colors, curing agents and the like. The molded articles obtained from such compositions are characterized by good surface gloss, by high "impact strength and impact strength notched" and an improved "Brinell-hardness."

The blends may furthermore be used for the production of cements and of foamed products.

The following examples illustrate the invention without being restricted thereto, the parts being by weight.

Example 1

60 parts of butadiene 1,3, 38 parts of acrylonitrile, 2 parts of acrylic acid are emulsified in 150 parts of water containing 4 parts of the sodium salt of a sulfonated long chain paraffin obtained by reacting a benzine fraction having a boiling point of 220-330° with $SO_2$ and chlorine and hydrolyzing the sulfochloride contained in an aqueous alkaline medium (see U.S. Patent 2,046,090). To this emulsion there are added 0.75 part of the sodium salt of an alkylsulfinic acid the alkyl group of which having 12-18 carbon atoms. As a modifier there are added 0.3 part of diisopropylxanthogen-disulfide. The polymerization temperature is kept at 28° C. The polymerization is continued until about 78 percent of the monomers are converted. Thereafter the copolymerization is stopped by adding 1 part of $Na_2S_2O_4$. The latex obtained is stabilized with 3 parts of phenyl-3-naphthylamine.

An oily xylene-formaldehyde resin, prepared from xylene with a surplus of formaldehyde in an aqueous medium in the presence of sulfuric acid is emulsified by heating 30 parts of it to 50-100° C. and adding the thinly fluid mass to 70 parts of a 3% aqueous solution of the above sulfonated long chain paraffin sodium salt while stirring intensively.

900 parts of the copolymer-emulsion are mixed with 100 parts of resin emulsion, whereafter the mixture is precipitated by adding NaCl, washed and dried.

100 parts of this product are compounded with 45 parts of an active gas black, 5 parts of zinc oxide, 2 parts of stearic acid, 1.5 parts of sulfur and 0.8 part of mercaptobenzothiazyldiethylamide. After vulcanization a product is obtained which has the properties compiled in line (d) of the following table. In this table line (a) gives the values of a corresponding vulcanizate prepared from a copolymer of the same type, however, without acrylic acid and without addition of the above formaldehyde resin and (b) with addition of formaldehyde resin. In line (c) the values of a vulcanizate corresponding to that of line (d), however, without addition of formaldehyde resin are listed.

|  | Plasticity number | Tensile strength, kg./cm.² | Elongation at break, percent | Rebound, percent | Modulus at 300% elongation | Swelling benzine benzene, percent | | Shore hardness |
|---|---|---|---|---|---|---|---|---|
| (a) | 1850 | 242 | 495 | 14 | 99 | 0.9 | 90 | 65 |
| (b) | 1150 | 221 | 580 | 12 | 88 | 0.7 | 79 | 64 |
| (c) | 2250 | 255 | 485 | 19 | 180 | 2.4 | 105 | 70 |
| (d) | 1500 | 267 | 485 | 16 | 135 | 1.7 | 97 | 68 |

Example 2

A copolymer is produced according to the recipe of Example 1, wherein 2 parts of acrylic acid are replaced by 2 parts of α-methacrolein. A vulcanizate is prepared as shown in the preceding example. The values obtained with the resin free blend (a) and the resin containing blend (b) are the following:

|  | Plasticity number | Tensile strength, kg./cm.² | Elongation at break, percent | Rebound, percent | Modulus at 300% elongation | Swelling benzine benzene, percent | | Shore hardness |
|---|---|---|---|---|---|---|---|---|
| (a) | 2100 | 239 | 420 | 18 | 127 | 2.1 | 112 | 71 |
| (b) | 950 | 264 | 520 | 15 | 111 | 1.8 | 109 | 67 |

The copolymer-resin-composition is characterized by an improved tensile strength.

Example 3

The recipe of Example 1 is modified by replacing the 38 parts of acrylonitrile and 2 parts of acrylic acid by 26 parts of acrylonitrile and 4 parts of acrylic acid. The properties of the resin-free vulcanizate are listed in the following table in line (a). A vulcanizate prepared from 90% of the above copolymer and 10% of the xylene-formaldehyde resin or 80% of copolymer and 20% resin respectively has characteristics listed in lines (b) and (c).

|  | Plasticity number | Tensile strength, kg./cm.² | Elongation at break, percent | Rebound, percent | Modulus at 300% elongation | Swelling benzine benzene, percent | | Shore hardness |
|---|---|---|---|---|---|---|---|---|
| (a) | 4700 | 273 | 370 | 22 | 180 | 3.0 | 113 | 71 |
| (b) | 3800 | 298 | 535 | 18 | 164 | 2.7 | 102 | 71 |
| (c) | 2500 | 270 | 450 | 14 | 140 | 0.9 | 101 | 69 |

Example 4

The recipe of Example 1 is modified by replacing the 38 parts of acrylonitrile and 2 parts of acrylic acid by 36 parts of acrylonitrile and 4 parts of methacrylic acid. There is obtained a resin-free vulcanizate having the characteristics disclosed in line (a) of the following table. In lines (b) and (c) the characteristics are listed of vulcanizates prepared from 90 parts of copolymer and 10 parts of resin or 80 parts of copolymer and 20 parts of resin respectively.

| | Plasticity number | Tensile strength, kg./cm.² | Elongation at break, percent | Rebound, percent | Modulus at 300% elongation | Swelling benzine benzene, percent | Shore hardness |
|---|---|---|---|---|---|---|---|
| (a) | 5500 | 264 | 290 | 18 | -------- | 3.0 | 101 | 79 |
| (b) | 4000 | 288 | 405 | 14 | 210 | 2.7 | 92 | 78 |
| (c) | 3400 | 297 | 420 | 13 | 192 | 2.0 | 88 | 75 |

*Example 5*

100 parts of the copolymer of Example 3 are compounded on rubber mixing rolls or in a Banbury mixer with 50 parts of a phenol-formaldehyde-novolak (see R. Houwink "Elastomers and Plastomers," vol. II, 1949, p. 6), containing 9.1 parts hexamethylene tetramine, with 5 parts of ZnO, 1 part of stearic acid, 1.8 parts of sulfur, 1.5 parts o-phenyl-α-naphthylamine and 1.0 part of N-diethyl-2-benzothiazylsulfenamide. After vulcanizing for 30 minutes at 147° C. products with the following characteristics (a) are obtained:

| | Tensile strength, kg./cm.² | Elongation at break, percent | Rebound, percent | Tear resistance | Swelling benzine benzene, percent | Shore hardness |
|---|---|---|---|---|---|---|---|
| (a) | 286 | 390 | 18 | 40 | 0.35 | 75 | 95 |
| (b) | 275 | 340 | 18 | 32 | 0.70 | 75 | 95 |

The values (b) are obtained from the above blend, to which were added before vulcanization 10 parts of the xylene-formaldehyde resin of Example 1. This resin may be admixed either to the latex or to the isolated copolymer. Tensile strength characteristics of this order have hitherto been obtained only when using active fillers such as "carbon black" or silicic acid. However with these filler tensile strength values of at most 25 kg./4 mm. were achieved. The new vulcanizates are especially valuable in view of their high tensile strength and their resistance to swelling.

*Example 6*

100 parts of the copolymer of Example 4 are compounded with 50 parts of the phenol-formaldehyde-novolak of Example 5 containing 9.1 parts by weight of hexamethylenetetramine, with 5 parts of ZnO, 1 part of stearic acid, 1.5 parts of phenyl-α-naphthylamine, 1.8 parts of sulfur and 1.0 part of N-diethyl-2-benzothiazylsulfonamide. After vulcanization the following characteristics (a) are obtained:

| | Tensile strength, kg./cm.² | Elongation at break, percent | Rebound, percent | Tear resistance | Swelling benzine benzene, percent | Shore hardness |
|---|---|---|---|---|---|---|---|
| (a) | 240 | 150 | 17 | 61 | 1.6 | 62 | 95 |
| (b) | 245 | 230 | 17 | 45 | 1.3 | 54 | 95 |
| (c) | 218 | 165 | 15 | 45 | 0.4 | 46 | 95 |

After addition of 10 parts and 20 parts respectively of the xylene-formaldehyde resin of Example 1 the characteristics (b) and (c) are obtained.

Vulcanizates with a tensile strength of 61 kg./4 mm. have hitherto not been prepared even on the basis of natural rubber-carbon black-blends.

*Example 7*

10 parts of a copolymer prepared from 60 parts butadiene, 40 parts of acrylonitrile and 4 parts methacrylic acid (Defo 1200) and 40 parts of a phenolformaldehyde-resol (See R. Houwink loc. cit. page 7), are mixed and compounded with 50 parts of wood flour on heated rollers. The sheets formed do not stick to the rolls. They are comminuted more easily than the blends obtained with butadiene-acrylonitrile copolymers. The characteristics of molded articles produced from this molding powder are listed in the table of Example 8.

*Example 8*

10 parts of the copolymer from 60 parts of butadiene, 40 parts acrylonitrile and 4 parts methacrylic acid (Defo value 3500) are mixed with 40 parts of the phenol-formaldehyde-resol of Example 7 and compounded with 50 parts of wood flour on heated rollers. The sheets obtained are comminuted. In the following table the characteristics of this molding powder are listed together with the values obtained from a molding powder T, which is produced as follows:

10 parts of the copolymer from 60 parts butadiene and 40 parts acrylonitrile (Defo value 1000) and 40 parts of the phenol-formaldehyde-resol of the preceding examples are worked up into a molding powder together with 50 parts of wood flour as disclosed in Example 7.

| | T | Example 1 | Example 2 |
|---|---|---|---|
| Impact strength, cm. kg./cm.² | 10.1 | 15.5 | 15.6 |
| Impact strength notched, cm. kg./cm.² | 4.2 | 4.9 | 4.5 |
| Bending strength, kg./cm.² | 358 | 561 | 570 |
| Bending, mm | 3.5 | 5.7 | 5.5 |
| Softening point | 107 | 111 | 114 |
| Surface resistance (comparative values) | 8 | 10 | 9 |
| Dielectric losses (800 cycles) | 0.24 | 0.13 | 0.14 |
| Dielectric const. (800 cycles) | 7.5 | 6.6 | 6.8 |

The characteristics of the molded articles produce from copolymers of the present invention surpass those of product T. Moreover the former articles have a higher surface gloss than the latter. Furthermore the rolling time may be reduced from 25 minutes to 15 minutes without impairing the quality of the final product.

*Example 9*

A copolymer is prepared from 60 parts of butadiene 1,3, 39 parts of acrylonitrile and 1 part of α-methylacrolein under the conditions disclosed in Example 1. The copolymer has the Defo value 1,500.

6 parts of this copolymer are mixed with 44 parts of the novolak of Example 5, containing 8 parts of hexamethylenetetramine and thereafter compounded with 50 parts of wood flour. The characteristics of molded articles produced from this molding powder as compared with those produced from a corresponding molding powder to which no novolak was added are the following:

| | Without copolymer | With copolymer |
|---|---|---|
| Bending strength, kg./cm.² | 680 | 770 |
| Impact strength notched, kg./cm.² | 7.5 | 10 |
| Brinell hardness | 1,800 | 1,570 |
| Softening point (Martens) ° C | 120 | 115 |

The molded articles according to the present invention have improved bending strength and impact strength characteristics while the characteristics of Brinell hardness and softening point have slightly decreased.

We claim:
1. A composition of matter comprising (1) a rubber-like copolymer of (a) 30–85% of a butadiene, (b) 5–45% of compounds selected from the group consisting of acrylic nitriles, acrylic acid esters and methacrylic acid esters, and (c) 0.5–20% of an organic compound containing besides copolymerizable double bonds reactive carboxylic acid groups, and (2) a fusible, soluble resin-forming condensation product of formaldehyde with a compound selected from the group consisting of phenols, aromatic hydrocarbons, alkylated aromatic hydrocarbons, urea, thiourea, melamine and aromatic sulfonamides.

2. A composition of matter according to claim 1, wherein the formaldehyde condensation product is a novolak.

3. A composition of matter according to claim 1, wherein the formaldehyde condensation product is a condensation product of xylene and formaldehyde.

4. A vulcanizable composition comprising a major proportion of the rubber-like copolymer of claim 1 and a minor proportion of the fusible, soluble formaldehyde condensation product.

5. Molded articles produced from the composition of claim 1.

6. A vulcanizate produced from the composition of claim 4.

7. A composition of matter comprising (1) a rubber-like copolymer of (a) 30–85% of a butadiene, (b) 5–45% of compounds selected from the group consisting of acrylic nitriles, acrylic acid esters and methacrylic acid esters, and (c) 0.5–20% of an ethylenically unsaturated aliphatic copolymerizable carboxylic acid, and (2) a fusible, soluble resin-forming condensation product of formaldehyde with a compound selected from the group consisting of phenols, aromatic hydrocarbons, alkylated aromatic hydrocarbons, urea, thiourea, melamine and aromatic sulfonamides.

8. A composition of matter according to claim 7 wherein the ethylenically unsaturated copolymerizable aliphatic carboxylic acid is acrylic acid.

9. A composition of matter according to claim 7, wherein the ethylenically unsaturated copolymerizable aliphatic carboxylic acid is methacrylic acid.

10. A composition of matter according to claim 7, wherein the ethylenically unsaturated copolymerizable aliphatic carboxylic acid is a monoester of polymerizable dicarboxylic acid with alcohols having 1–12 carbon atoms.

11. A composition of matter according to claim 10, wherein the polymerizable dicarboxylic acid is maleic acid.

12. A composition of matter according to claim 10, wherein the polymerizable dicarboxylic acid is fumaric acid.

13. A vulcanizable composition of matter according to claim 7 which contains sulfur as vulcanizing agent.

References Cited in the file of this patent

UNITED STATES PATENTS 2,669,553     Schaffel et al. _____ Feb. 16, 1954